United States Patent
McMurry et al.

(10) Patent No.: US 9,369,386 B2
(45) Date of Patent: Jun. 14, 2016

(54) METHODS, SYSTEMS, AND COMPUTER READABLE MEDIA FOR DESTINATION-HOST DEFINED OVERLOAD SCOPE

(71) Applicant: Oracle International Corporation, Redwood Shores, CA (US)

(72) Inventors: Sam Eric McMurry, Richardson, TX (US); Ben Allen Campbell, Irving, TX (US)

(73) Assignee: Oracle International Corporation, Redwood Shores, CA (US)

( * ) Notice: Subject to any disclaimer, the term of this patent is extended or adjusted under 35 U.S.C. 154(b) by 152 days.

(21) Appl. No.: 13/956,307

(22) Filed: Jul. 31, 2013

(65) Prior Publication Data

US 2015/0036486 A1    Feb. 5, 2015

(51) Int. Cl.
*H04L 12/801* (2013.01)
*H04L 12/26* (2006.01)

(52) U.S. Cl.
CPC .............. *H04L 47/12* (2013.01); *H04L 43/0882* (2013.01)

(58) Field of Classification Search
USPC ................................................. 370/229–240
See application file for complete search history.

(56) References Cited

U.S. PATENT DOCUMENTS

| | | | |
|---|---|---|---|
| 8,468,267 B2 | 6/2013 | Yigang et al. | |
| 8,601,073 B2 | 12/2013 | Craig et al. | |
| 8,879,431 B2 | 11/2014 | Ridel et al. | |
| 9,106,769 B2 | 8/2015 | Kanode et al. | |
| 9,240,949 B2 | 1/2016 | McMurry et al. | |
| 2003/0200277 A1 | 10/2003 | Kim | |
| 2007/0153995 A1 | 7/2007 | Fang et al. | |
| 2008/0250156 A1 | 10/2008 | Agarwal et al. | |
| 2009/0185494 A1 | 7/2009 | Li et al. | |
| 2009/0232011 A1 | 9/2009 | Li et al. | |
| 2010/0030914 A1* | 2/2010 | Sparks et al. | 709/235 |
| 2010/0211956 A1 | 8/2010 | Gopisetty et al. | |
| 2010/0299451 A1 | 11/2010 | Yigang et al. | |

(Continued)

FOREIGN PATENT DOCUMENTS

| | | |
|---|---|---|
| KR | 10-2009-0029348 | 3/2009 |
| WO | WO 2009/070179 A1 | 6/2009 |

(Continued)

OTHER PUBLICATIONS

Communication of European publication number and information on the application of Article 67(3) EPC for European Application No. 13776083.1 (Jan. 21, 2015).

(Continued)

*Primary Examiner* — Awet Haile
*Assistant Examiner* — Kent Krueger
(74) *Attorney, Agent, or Firm* — Jenkins, Wilson, Taylor & Hunt, P.A.

(57) ABSTRACT

Methods, systems, and computer readable media for Destination-Host defined overload scope are disclosed. According to one aspect, a method for Destination-Host defined overload scope includes, at an entity for processing Diameter signaling messages: identifying at least one Diameter session as a member of an overload group; specifying an alias for use to identify the entity for processing Diameter signaling messages as a destination of Diameter messages; associating the specified alias with the overload group; and including the specified alias in messages associated with members of the overload group.

15 Claims, 8 Drawing Sheets

(56) References Cited

U.S. PATENT DOCUMENTS

| | | |
|---|---|---|
| 2011/0040845 A1 | 2/2011 | Cai et al. |
| 2011/0061061 A1 | 3/2011 | Chen et al. |
| 2011/0090900 A1 | 4/2011 | Jackson et al. |
| 2011/0116382 A1 | 5/2011 | McCann et al. |
| 2011/0171958 A1 | 7/2011 | Hua et al. |
| 2011/0200053 A1 | 8/2011 | Kanode et al. |
| 2011/0202676 A1 | 8/2011 | Craig et al. |
| 2011/0299395 A1 | 12/2011 | Mariblanca Nieves |
| 2012/0044867 A1 | 2/2012 | Faccin et al. |
| 2012/0087368 A1 | 4/2012 | Kunarathnam et al. |
| 2012/0131165 A1 | 5/2012 | Banlel et al. |
| 2012/0155389 A1 | 6/2012 | McNamee et al. |
| 2012/0203781 A1 | 8/2012 | Wakefield |
| 2012/0221445 A1 | 8/2012 | Sharma |
| 2012/0221693 A1 | 8/2012 | Cutler et al. |
| 2012/0303796 A1 | 11/2012 | Mo et al. |
| 2012/0303835 A1 | 11/2012 | Kempf et al. |
| 2012/0307631 A1 | 12/2012 | Yang et al. |
| 2013/0039176 A1 | 2/2013 | Kanode et al. |
| 2013/0124712 A1 | 5/2013 | Parker |
| 2013/0163429 A1 | 6/2013 | Dunstan et al. |
| 2013/0188489 A1 | 7/2013 | Sato |
| 2013/0223219 A1 | 8/2013 | Mir et al. |
| 2013/0250770 A1 | 9/2013 | Zou et al. |
| 2013/0275583 A1 | 10/2013 | Roach et al. |
| 2014/0192646 A1 | 7/2014 | Mir et al. |
| 2014/0310388 A1 | 10/2014 | Djukic et al. |
| 2014/0376380 A1 | 12/2014 | Campbell et al. |
| 2015/0036504 A1 | 2/2015 | McMurry et al. |
| 2015/0036505 A1 | 2/2015 | Sparks et al. |
| 2015/0085663 A1 | 3/2015 | McMurry et al. |
| 2015/0149656 A1 | 5/2015 | McMurry et al. |

FOREIGN PATENT DOCUMENTS

| | | | |
|---|---|---|---|
| WO | WO 2011/161575 A1 | 12/2011 | |
| WO | WO 2012/119147 A1 | 9/2012 | |
| WO | WO 2012/130264 A1 | 10/2012 | |
| WO | WO 2013/155535 A1 | 10/2013 | |
| WO | WO 2015/017422 A1 | 2/2015 | |
| WO | WO 2015/041750 A1 | 3/2015 | |
| WO | WO 2015/080906 A1 | 6/2015 | |

OTHER PUBLICATIONS

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Notification of Transmittal of the International Search Report and the Written Opinion for of the International Searching Authority, or the Declaration for International Application No. PCT/US2014/048651 (Nov. 17, 2014).

Notification of Transmittal of the International Search Report and the Written Opinion of the International Searching Authority, or the Declaration for International Application No. PCT/US2014/048644 (Oct. 17, 2014).

Commonly-assigned, co-pending International Application No. PCT/US14/48651 for "Methods, Systems, and Computer Readable Media for Diameter Load and Overload Information and Virtualization," (Unpublished, filed Jul. 29, 2014).

Commonly-assigned, co-pending International Application No. PCT/US14/48644 for "Methods, Systems, and Computer Readable Media for Mitigating Traffic Storms," (Unpublished, filed Jul. 29, 2014).

Commonly-assigned, co-pending U.S. Appl. No. 14/034,478 for "Methods, Systems, and Computer Readable Media for Diameter Load and Overload Information and Virtualization," (Unpublished, filed Sep. 23, 2013).

Tschofenig, "Diameter Overload Architecture and Information Model," draft-tschofenig-dime-overload-arch-00.txt, DIME, pp. 1-9 (Jul. 16, 2013).

Notification of Transmittal of the International Search Report and the Written Opinion of the International Searching Authority, or the Declaration for International Application No. PCT/US2013/036664 (Jul. 2, 2013).

Campbell, "Diameter Overload Control Solution Issues," draft-campbell-dime-overload-issues-00, pp. 1-16 (Jun. 2013).

"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).

Roach et al., "A Mechanism for Diameter Overload Control," draft-roach-dime-overload-ctrl-03, DIME, pp. 1-49 (May 17, 2013).

Korhonen et al., "The Diameter Overload Control Application (DOCA)," draft-korhonen-dime-ovl-01.txt, Diameter Maintenance and Extensions (DIME), pp. 1-18 (Feb. 25, 2013).

Fajardo et al., "Diameter Base Protocol," RFC 6733, pp. 1-152 (Oct. 2012).

McMurry et al., "Diameter Overload Control Requirements," draft-ietf-dime-overload-reqs-00, pp. 1-25 (Sep. 21, 2012).

"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).

Calhoun et al., "Diameter Base Protocol," RFC 3588, pp. 1-147 (Sep. 2003).

Notification of Transmittal of the International Search Report and the Written Opinion of the International Searching Authority, or the Declaration for International Application No. PCT/US2014/066240 (May 13, 2015).

Non-Final Office Action for U.S. Appl. No. 13/956,304 (May 4, 2015).

Non-Final Office Action for U.S. Appl. No. 13/956,300 (Apr. 8, 2015).

Notice of Allowance and Fee(s) Due and Examiner-Initiated Interview Summary for U.S. Appl. No. 13/572,156 (Apr. 6, 2015).

Non-Final Office Action for U.S. Appl. No. 13/863,351 (Mar. 27, 2015).

Non-Final Office Action for U.S. Appl. No. 14/034,478 (Mar. 23, 2015).

Final Office Action for U.S. Appl. No. 13/572,156 (Dec. 29, 2014).

Non-Final Office Action for U.S. Appl. No. 13/572,156 (May 23, 2014).

"Split Architecture for Large Scale Wide Area Networks," SPARC ICT-258457 Deliverable D3.3, pp. 1-129 (Dec. 1, 2011).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

Final Office Action for U.S. Appl. No. 14/034,478 (Sep. 8, 2015).

Applicant-Initiated Interview Summary for U.S. Appl. No. 13/956,304 (Aug. 5, 2015).

Applicant-Initiated Interview Summary for U.S. Appl. No. 13/956,300 (Jun. 29, 2015).

Commonly-assigned, co-pending U.S. Appl. No. 14/720,412 for "Methods, Systems, and Computer Readable Media for Short and Long Term Policy and Charging Rules Function (PCRF) Load Balancing," (Unpublished, filed May 22, 2015).

"Multi-Protocol Routing Agent User Guide," Policy Management, 910-6648-001 Revision A, pp. 1-70 (Mar. 2013).

"Multi-Protocol Routing Agent User Guide," Policy Management, 910-6404-001 Revision A, pp. 1-70 (Jun. 2012).

Applicant-Initiated Interview Summary for U.S. Appl. No. 13/956,304 (Feb. 1, 2016).

Applicant-Initiated Interview Summary for U.S. Appl. No. 14/092,898 (Jan. 14, 2016).

Non-Final Office Action for U.S. Appl. No. 14/313,610 (Jan. 11, 2016).

Extended European Search Report for European Application No. 13776083.1 (Dec. 14, 2015).

Supplemental Notice of Allowability for U.S. Appl. No. 13/956,300 (Dec. 1, 2015).

(56) References Cited

OTHER PUBLICATIONS

Advisory Action for U.S. Appl. No. 13/863,351 (Nov. 25, 2015).
Advisory Action for U.S. Appl. No. 14/034,478 (Nov. 17, 2015).
Final Office Action for U.S. Appl. No. 13/956,304 (Nov. 3, 2015).
Notice of Allowance and Fee(s) Due & Examiner-Initiated Interview Summary for U.S. Appl. No. 13/956,300 (Oct. 23, 2015).
Non-Final Office Action for U.S. Appl. No. 14/092,898 (Oct. 8, 2015).
Final Office Action for U.S. Appl. No. 13/863,351 (Sep. 11, 2015).

* cited by examiner

US 9,369,386 B2

METHODS, SYSTEMS, AND COMPUTER READABLE MEDIA FOR DESTINATION-HOST DEFINED OVERLOAD SCOPE

TECHNICAL FIELD

The subject matter described herein relates to methods and systems for implementing Diameter overload control. More particularly, the subject matter described herein relates to methods, systems, and computer readable media for Destination-Host defined overload scope.

BACKGROUND

Diameter is an authentication, authorization, and accounting (AAA) protocol for computer networks, and is a successor to Radius. The Diameter base protocol is defined in International Engineering Task Force (IETF) request for comments (RFC) 3588 which is incorporated by reference herein in its entirety. Diameter messages use a per user framework and exist in the format of request-answer messages. Diameter answer messages travel back to the request source via the same path through which the request message was routed using hop-by-hop transport.

Diameter messages may be exchanged between Diameter nodes for performing various functions. For example, a mobility management entity (MME) and a home subscriber server (HSS) may interact for authentication, authorization, and/or accounting (AAA) purposes. Since communications networks use Diameter messages to perform a variety of functions, it is important to make sure that Diameter nodes are working correctly and as expected.

Network resource utilization, or "load", is a valuable indicator of network conditions and profoundly affects network performance. Load may be expressed as a raw number, such as packets per second, or as percentage of maximum capacity. A telecommunications network has a variety of components, such as communications links, processors, databases, etc. If one component becomes fully loaded, e.g., operating at 100% capacity, or overloaded, e.g., turning away requests for processing because there is no available capacity, the performance of the entire network may suffer, particularly if the overloaded component provides a critical function. Using the world wide web as an example, most web browsers must perform a domain name system (DNS) lookup to translate a universal resource identifier (URI) or universal resource locator (URL) address into an IP address. If the DNS service goes down, web browsing traffic will also grind to a halt because a critical function—the DNS lookup—is unavailable.

Therefore, knowledge of network load is extremely useful and may be used to get a picture of overall network health and to identify existing and potential problems. In this context, the terms "load" and "overload" have somewhat overlapping meanings: for example, a node may be said to be "loaded" when its utilization is between 0% and 100% and "overloaded" when its utilization is greater than 100% percent. In another example, a node that is part of a matched pair of nodes that provide the same function in a distributed manner may be considered "overloaded" if its capacity is greater than 50%, since the other 50% must be reserved for use in case the other node in the pair fails and causes that node's traffic to be handled by the first node. Similarly, if a node reports its utilization as being less than some overload threshold, such as message may be considered a "load indication", but if the node reports its utilization as being greater than the threshold, such as message may be considered an "overload indication".

In other words, the difference between a "load message" and an "overload message" may be a matter of degree. For simplicity, the terms "load" and "overload" will be used synonymously herein unless explicitly stated otherwise.

Determining network load, however, can be challenging. Determining the load of a segment of a packet network, for example, may require the attachment of monitoring devices or taps to the physical link itself. Determining the load of a network server may be difficult if the server OS does not have the capacity to monitor its own processor load, memory utilization, and so on. Even if the load of a particular entity within the network can be determined, there is still the challenge of conveying that load information to other nodes in the network in a form that the other nodes understand and can use to make decisions or take action to help mitigate a loaded or overloaded component of the network.

Exemplary methods and systems for performing overload control are described in commonly-owned, co-pending U.S. patent application Ser. No. 13/863,351, filed Apr. 15, 2013 (herein referred to as "the '351 application"), the disclosure of which is incorporated herein by reference in its entirety. The '351 application discloses the use of Diameter messages to convey load or overload information using Diameter attribute-value pairs, or "AVPs", that may be inserted into existing Diameter messages or may be a part of a stand-alone Diameter message for this purpose. A "Load AVP" is an AVP that may report a load or overload condition, and an "Overload AVP" is an AVP that may describe an action to be taken to mitigate an overload condition.

The subject matter described herein describes a different mechanism that may also be used to perform Diameter overload control. More specifically, the subject matter described herein describes methods, systems, and computer readable media for Destination-Host defined overload scope.

SUMMARY

According to one aspect, a method for Destination-Host defined overload scope includes, at an entity for processing Diameter signaling messages within a telecommunications network: identifying at least one Diameter session as a member of an overload group; specifying an alias for use to identify the entity for processing Diameter signaling messages as a destination of Diameter messages; associating the specified alias with the overload group; and including the specified alias in messages associated with members of the overload group.

According to another aspect, the subject matter described herein includes a system for Destination-Host defined overload scope. The system includes a Diameter node having at least one network interface for receiving a Diameter message and a Diameter overload control unit for: identifying at least one Diameter session as a member of an overload group; specifying an alias for use to identify the entity for processing Diameter signaling messages as a destination of Diameter messages; associating the specified alias with the overload group; and including the specified alias in messages associated with members of the overload group.

As used herein, the term "Diameter connection" refers to a transport layer connection between two peers, used to send and receive Diameter messages. A "session" is a logical concept at the application layer, and refers to a logically related series of transactions or other communications between an access device and a server. A session may be identified via a Session-Id AVP.

As used herein, the term "overload scope" refers to a monitoring and/or reporting construct used for describing, specifying, defining, and/or constraining an overload event and related overload control action(s) to relevant parties, entities, or areas. In one embodiment, the overload scope is used to identify a set of relevant Diameter requests that may be rate limited or prohibited in order to abate an overload condition.

As used herein, the term "overload group" refers to a logical collection of entities that may be the subject or target of an overload control action. An overload group may contain members that are likely to be affected by a particular overload event.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for Destination-Host defined overload scope. Advantageously, some aspects of the present subject matter described herein can be used for managing Diameter overload (e.g., when traffic or processing load is greater than a node can or should handle) or other conditions. For example, a Diameter agent (e.g., a Diameter routing node (DRN) or a Diameter signaling router (DSR)) in accordance with aspects of the present subject matter described herein may determine an overload scope.

The subject matter disclosed herein describes the use of a Diameter Destination-Host AVP in a non-standard way, i.e., as a means to identify Diameter sessions as being members of a Diameter overload scope. By using Destination-Host based overload scopes and informing relevant nodes about overload, some aspects of the subject matter described herein may be used to abate overload or related problems associated with overloaded Diameter entities (e.g., applications, nodes, groups, sessions, connections, realms, etc.) without significantly affecting other, non-overloaded Diameter entities. As will be described in more detail below, this technique is well-suited for topology hiding.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
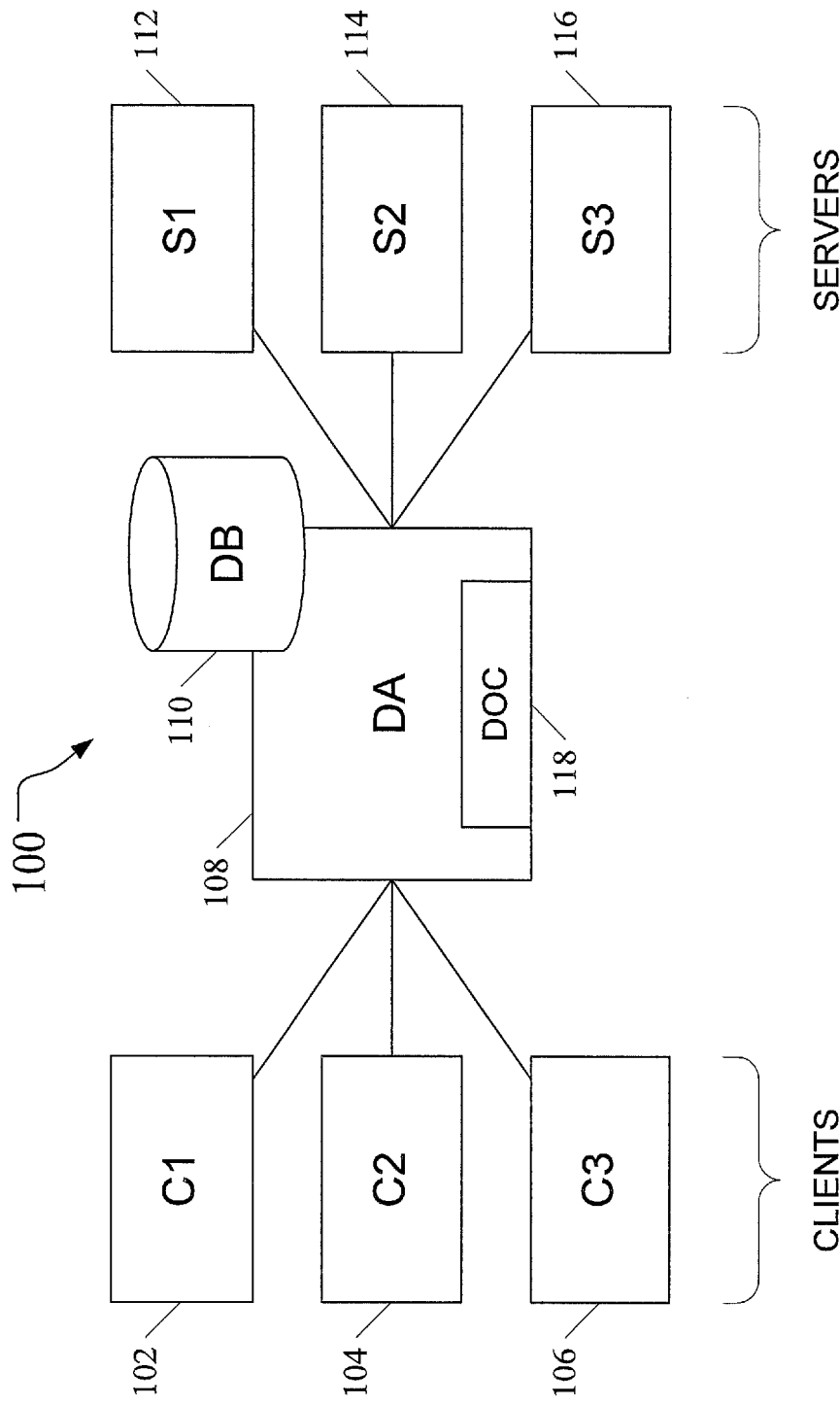
FIG. 1 is a diagram illustrating an exemplary environment for Destination-Host defined overload scope according to an embodiment of the subject matter described herein.

FIG. 1 is a diagram illustrating an exemplary environment 100 for Destination-Host defined overload scope according to an embodiment of the subject matter described herein. Exemplary environment 100 may include one or more networks and may include one or more Diameter nodes, such as Diameter clients 102-106, a Diameter routing node (DRN), Diameter signaling router (DSR), or Diameter agent (DA) 108, which may include or otherwise communicate with an associated database DB 110, and Diameter servers 112-116.

Each of Diameter clients 102-106 may represent any suitable entity (e.g., a computing platform include at least one processor and memory) for requesting one or more services from Diameter servers 112-116. For example, Diameter client 102 may send a Diameter request message for requesting one or more services at an application hosted by Diameter server S1 112. Each of Diameter servers 112-116 may represent any suitable entity (e.g., a computing platform include at least one processor and memory) for providing or performing one or more services for Diameter clients 102-106. For example, S1 112 may send a Diameter answer message (e.g. a Diameter response message) in response to receiving and processing a Diameter request message.

Exemplary Diameter clients 102-106 or Diameter servers 112-116 may include a mobility management entity (MME), a home subscriber server (HSS), an authentication, authorization, and accounting (AAA) server, a Bearer Binding and Event Reporting Function (BBERF), a serving gateway (SGW), a packet data network gateway (PDN GW), a charging data function (CDF), an online charging system, an offline charging system, a policy charging enforcement function (PCEF), a policy charging and rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a correlation node, a node, a database, a signaling gateway, a gateway, a monitoring node, a Diameter message processor, a data collection platform, a multi-protocol signaling gateway, a multi-protocol signaling router, or a computing platform.

DA 108 may be any suitable entity for performing Diameter overload control and/or related functions described herein. For example, DA 108 may be implemented on a computing platform with one or more processors and one or more network interfaces for receiving or transmitting messages. Examples of DA 108 may include, but are not limited to, a DSR, a DRN, a Diameter routing agent, a Diameter relay agent, a Diameter redirect agent, a Diameter translation agent, and a Diameter proxy agent.

DA 108 may include functionality for receiving, processing and/or routing various messages (e.g., protocol data units (PDUs)) and may include various communications interfaces for communication with Diameter nodes, e.g., 3rd Generation Partnership Project (3GPP) LTE communications interfaces and other (e.g., non-LTE) communications interfaces. In some embodiments, receiving, processing, and/or routing functionality may be included in one or more modules. For example, DA 108 may include or have access to one or more modules for receiving Diameter signaling messages associated with multiple different Diameter signaling interfaces, e.g., S9, S6a, S11, Cx, and Dx.

In some embodiments, DA 108 may receive Diameter messages via other Diameter interfaces. For example, DA 108 may receive Diameter messages via an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

DA 108 may facilitate communication between Diameter clients 102-106 and Diameter servers 112-116. For example, Diameter client 102 may send a Diameter request message (e.g., a Diameter session establishment request message) to DA 108. The Diameter request message may require one or more services from S1 112. DA 108 may route, relay, and/or translate requests or responses between Diameter client 102 and S1 112. After receiving and processing the Diameter request message, S1 112 may send a Diameter response message (e.g., a Diameter session establishment response message) to DA 108. The Diameter response message may be in response to a Diameter request message originated by Diameter client 102. DA 108 may provide the Diameter response message to Diameter client 102.

DA 108, or a module therein, may perform one or more functions prior to providing a Diameter message to another node. For example, prior to providing a Diameter response message to Diameter client 102, DA 108, or a module therein, may modify the Diameter message by inserting or including Diameter overload control information or other related data in the modified Diameter message. In some embodiments, Diameter overload control information may be stored in one or more attribute value pairs (AVPs) located in a payload portion of the modified Diameter message.

System 100 may include a Diameter overload control unit (DOC) 118. DOC 118 may be any suitable entity (such as a module or software executing on a processor) for performing Diameter overload control, overload management, and/or related functions. In the embodiment illustrated in FIG. 1, DOC 118 is a component within DA 108, but in alternative embodiments, DOC 118 may be located within another node or be a stand-alone entity. In one embodiment, DOC 118 may be configured to control or attempt to abate overload or other problems associated by overloaded Diameter servers 112-116. DOC 118 may be configured to determine one or more Diameter overload scopes. In the embodiment illustrated in FIG. 1, Destination-Host may be specified as a Diameter overload scope. Other Diameter overload scopes may include, but are not limited to, a realm, an application, a host, a session group, a session, or a connection. For example, DOC 118 may assign each Diameter session to an overload group whose members all use a specified alias in the Destination-Host AVP of messages that are being sent to DA 108.

DOC 118 may be configured to monitor or detect overload from one or more Diameter nodes, realms, applications, or other entities. For example, DOC 118 may subscribe to Diameter servers 112-116 or may periodically or aperiodically (e.g., dynamically based on certain factors) poll Diameter servers 112-116 for overload information. In this example, when DA 108 or DOC 118 receives an indication that one of the Diameter servers is overloaded, DA 108 or DOC 118 may send messages to each of Diameter clients 102-106 indicating the overload group that is overloaded.

In some embodiments, DOC 118 may be configured to provide or utilize some information on a hop-by-hop basis. For example, as a Diameter request message progresses through a network, an intermediary node may remove Diameter overload control information (e.g., stored in a Load-Info AVP) provided by a previous node or hop and may use the Diameter overload control information. In this example, the intermediary node may change or modify received Diameter overload control information and may re-insert some modified information in its own Load-Info AVP, e.g., prior to forwarding the message to another node.

In some embodiments, when sending a response to a node that supports overload control or overload management, a node (e.g., DA 108 or one of Diameter servers 112-116) may include one or more Load-Info AVP with overload-related and load-related information. In some embodiments, if multiple Load-Info AVPs are present, each Load-Info AVP may be associated with different overload scopes.

In some embodiments, Diameter clients 102-106 may take various actions in response to learning an upstream node (e.g., DA 108 or one of Diameter servers 112-116) is overloaded. Exemplary actions may include client prioritization of certain types of requests over others, selection of an alternate peer (e.g., as long as the overload properties of that peer are honored) for processing, sending an error message, and dropping or discarding the Diameter message. In some embodiments, Diameter clients 102-106 may perform any actions necessary to shape its traffic according to provided overload control information, such as overload metrics or load abatement procedures provided in an Overload-Control-Metric AVP. In some embodiments, Diameter clients 102-106 may use Diameter overload control information in selecting a most desirable (e.g., the least-loaded available) Diameter server.

In some embodiments, DA 108 may take various actions in response to learning an upstream node (e.g., one of Diameter servers 112-116) is overloaded. Exemplary actions may include instructing a client to perform one or more actions, prioritization of certain types of requests over others, selection of an alternate peer (e.g., as long as the overload properties of that peer are honored), sending an error message (e.g., a DIAMETER_UNABLE_TO_DELIVER message, a DIAMETER_PEER-_IN_OVERLOAD message, a DIAMETER_TOO_BUSY message, or a transient failure message), or dropping or discarding the Diameter message.

In some embodiments, reporting overload may correspond to an appropriate overload context or scope. For example, if an application "R" is overloaded at Diameter server S2 114, but an application "S" at S2 114 is not overloaded, DA 108 may inform one or more nodes about overload at S2 114 with an overload scope type of "Application" and may indicate that only Application "R" is overloaded. In this example, Diameter clients 102-106 may receive the indication and throttle only traffic that is requesting application "R" at S2 114. In another example, absent other natural divisions (application, realm, etc.), DA 108 may assign each of Diameter servers 112-116 to their own "Overload Contexts". As will be described in more detail below, DA 108 may create a proxy address, or alias, that will eventually become the value that is placed in Destination-Host AVPs of messages that are being sent to DA 108 from other nodes. In this example, in response to receiving an indication of overload for a certain Destination-Host address, Diameter clients 102-106 may perform one or more actions to lessen or abate traffic directed to that specified Destination-Host address. In some embodiments, DA 108 may use Diameter overload control information in selecting a desirable (e.g., the least-loaded or least overloaded available) Diameter server.

In some embodiments, DA 108 and/or other overload-aware nodes may be configured for rapid processing of Diameter messages containing Diameter overload control information or related AVPs. For example, less common overload scopes and/or related AVPs may be ignored or associated processing may be truncated.

In some embodiments, Diameters messages may be constructed such that intermediary nodes can quickly determine whether a message contains overload control related information, e.g., without parsing all the AVPs. For example, a new bit or command flag may be set in a header portion of a Diameter message when Diameter overload control information is present or a Diameter message may position Load-Info AVP 200 as a first AVP in its Diameter payload portion.

In some embodiments, Diameter servers 112-116 may include functionality for performing one or more aspects associated with Diameter overload control. For example, Diameter servers 112-116 may be overload-aware. Diameter servers 112-116 may be configured to push back on received traffic by sending overload indications to peers. For example, Diameter servers 112-116 may be configured to report load metrics (e.g., a percentage of resources utilized or left) to DA 108, Diameter clients 102-106, or other nodes. Decisions associated with reporting overload metrics (e.g., what to report and to whom) may be determine by local server policy, a remote node, or an operator.

In some embodiments, when overloaded, Diameter servers 112-116 may be configured to reject transactions from non-overload-aware peers at a same rate that they would be suppressed if they did support overload control. By rejecting transactions, Diameter servers 112-116 may prevent overload-aware peers from being "starved out" by peers that do not support overload management. If capacity is outstripped despite sending overload indications, Diameter servers 112-116 may be configured to reject transactions even if they originate from overload-aware nodes.

While FIG. 1 depicts DA 108 communicating with (e.g., receiving Diameter messages from) various Diameter nodes, it will be appreciated that DA 108 may communicate with the nodes depicted and other nodes (not depicted) via additional and/or different interfaces. It will also be appreciated that DA 108 may include fewer, additional, or different modules and/or components.

Figure 2:
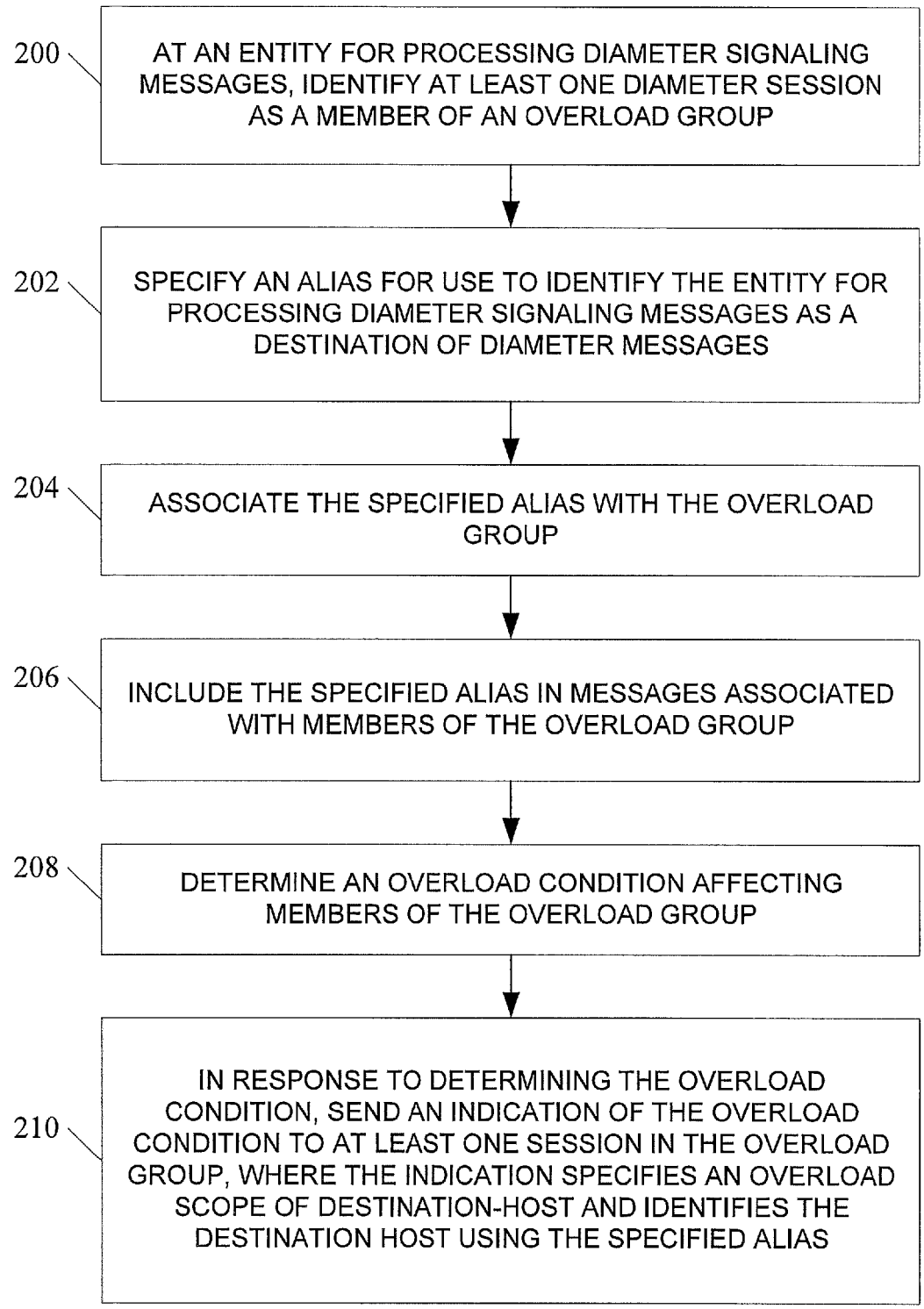
FIG. 2 is a flow chart illustrating an exemplary process for Destination-Host defined overload scope according to an embodiment of the subject matter described herein.

FIG. 2 is a flow chart illustrating an exemplary process for Destination-Host defined overload scope according to an embodiment of the subject matter described herein. This process will now be described with reference to FIGS. 1 and 2.

In FIG. 2, step 200, at an entity for processing Diameter signaling messages, at least one Diameter session is identified as a member of an overload group. Referring to the embodiment illustrated in FIG. 1, for example, a client, such C2 104, may request a session with a server, such as server3 116. This request may be intercepted by an entity for processing Diameter signaling messages, such as DA 108. DA 108 may decide to create a new overload group and add the newly requested session to that overload group. Alternatively, DA 108 may determine that there is already an overload group that includes other sessions with server3 116 and may therefore decide to add the newly requested session to the pre-existing overload group.

In the embodiment illustrated in FIG. 1, the list of overload groups, and the association of sessions to overload groups, may be maintained in database 110, which may be local to or remote from DA 108. Examples of local databases include but are not limited to those which are located within or co-located with DA 108 and accessible via local bus or local area network. Examples of remote databases include but are not limited to those which are not physically co-located with DA 108 but are accessible via remote access network protocols, such as FTP, HTTP, TCAP, SOAP, XML, etc.

Conceptually, an overload group may represent any logical grouping of physical or logical entities that would likely be affected by an overload condition somewhere on the network. In this example, the overload group represents sessions that use a particular resource, such as a particular server (i.e., server3 116) and/or a particular service. If server3 116 becomes overloaded or fails entirely, for example, DA 108 can use the overload group associated with that resource to identify sessions that depend on this overloaded or failing resource.

Alternatively, an overload group may represent a class of subscribers whose access to network resources will be curtailed if and when an overload condition occurs. For example, in a network that has gold, silver, and bronze subscribers having high, medium, and low guaranteed QoS, respectively, bronze subscribers may be members of a bronze overload group, whose ability to access high-bandwidth network content may be revoked during periods of high network load.

In general, overload groups may represent any logical organization, such as: sessions having the same client; sessions having the same category of client; sessions having the same priority; sessions having the same quality of service (QoS) level; sessions having the same server; sessions using the same service or application on a server; sessions that use the same service or application across multiple servers; sessions that use the same communications path or link; sessions that enter or exit a network through a particular node or gateway, and so on.

In step 202, an alias is specified for use to identify the entity for processing Diameter signaling messages as a destination for Diameter messages, and in step 204, the specified alias is associated with the overload group. An alias may be any value that satisfies the syntax requirements for an Origin-Host or Destination-Host AVP. For example, DA 108 may maintain a number of distinct network addresses, such as Internet protocol (IP) addresses, all of which point to DA 108. In one embodiment, one of the available IP addresses are selected as the alias for the overload group. When an overload group is disbanded, e.g., when all sessions in that group have been terminated, that IP address may be returned to a pool of available IP addresses for use by another overload group. Other types of addresses may also be used. Moreover, in network configurations in which a node, such as a client node, sends all requests to DA 108 regardless of the Destination-Host value, the alias used as the value in the Destination-Host AVP does not need to resolve to an actual address of DA 108.

In step 206, the specified alias is included in messages associated with members of the overload group, e.g., as an Origin-Host value in a message going from DA 108. For example, DA 108 may forward the session request to server3 116, which sends a response message back to C2 104. The response message may include an Origin-Host value that identifies server3 116 as the sender of the message. Normally, when C2 104 receives a response message, C2 104 will note the Origin-Host value, which C2 104 will use as the Destination-Host for subsequent messages to server3 116. In the subject matter described herein, however, DA 108 intercepts the response message and substitutes the original Origin-Host value that identified server3 116 as the sender of the message with the alias specified for members of that overload group. In this manner, when C2 104 receives the modified response message, the modified message will include the alias as the Origin-Host value, which C2 104 will then use as the Destination-Host value in all subsequent messages to server3 116. C2 104 will typically maintain a table or other means to associate the established session with the address of what C2 104 assumes is the server but which in reality is an alias that DA 108 associates with a particular overload group. In one embodiment, DA 108 maintains a lookup table so that when subsequent messages arrive from C2 104 addressed to the specified alias associated with that particular overload group, e.g., the Destination-Host AVP lists the alias as the destination host address, DA 108 knows to remap the alias to the actual intended destination, e.g., server3 116.

In step 208, an overload condition affecting members of the overload group is determined or detected. For example, server3 116 may issue a Diameter message that indicates that it is approaching maximum load capacity or that it is already at maximum load capacity. DA 108 may receive such a message directly or it may intercept such a message that is being sent by server3 116 to some or all of server3's clients. Alternatively, a traffic detection mechanism separate from server3 116 may detect an indication that server3 116 is overloaded, and issue notifications to the appropriate entities. In one embodiment, DA 108 may detect an increase in response time from server3 116, detect that server3 116 has stopped responding altogether, or other indication, and determine that server3 116 is overloaded or approaching an overloaded state.

In step 210, in response to determining the overload condition, an indication of the overload condition is sent to at least one node that is associated with a session in the overload group, such as a Diameter entity that participates in a session in the overload group. In one embodiment, the indication specifies an overload scope of "Destination-Host" and includes the alias as the Value portion of a Destination-Host AVP. For example, DA 108 may issue a Diameter message such as will be described in FIG. 3, below.

When the indication of the overload condition is received by C2 104, it may take steps to mitigate the overload condition. For example, C2 104 may impose a message rate limit for all outgoing messages that are addressed to the value in the received Destination-Host AVP, e.g., the alias. Thus C2 104 believes that it is reducing traffic to a particular node, i.e., one that is identified by the received Destination-Host AVP. For reasons that will be explained in more detail below, C2 104 may in reality be reducing traffic to a node, a service or application on a node, multiple nodes, or a service or application distributed across multiple nodes, to give a few examples. Thus, by using Destination-Host based overload scopes, DA 108 can hide details about the topology of the network, such as preventing Diameter clients from knowing the number and location of Diameter servers and vice versa.

In this manner, DA 108 and C2 104 may cooperate to mitigate the overload condition by shaping, limiting, or completely suppressing traffic generated by or otherwise associated with members of the overload group. In some embodiments, the exemplary process described herein, or portions thereof, may be performed at or performed by DA 108, DOC 118, any of Diameter servers 112-116, any of Diameter clients 102-106, a Diameter node, and/or another module or node.

In some embodiments, the method mentioned above may include communicating the indication of the overload condition using one or more overload related attribute value pairs (AVPs) (e.g., Load-Info AVP 200) and may include inserting the one or more overload related AVPs into the Diameter message.

In some embodiments, a node that receives the indication of the overload condition may use information contained within that indication to abate load associated with a Diameter overload scope at the receiving node or at a node separate from the receiving node, which may be the node that sent the indication or may be a third node. The node that sent the indication (the origination node) and/or the node that receives the indication (the destination node) may be a Diameter client, a Diameter server, a Diameter agent, a Diameter routing node, a Diameter signaling router, or other types of nodes that support the Diameter protocol and possibly other protocols.

In some embodiments, the Diameter overload scope in the method mentioned above may include a node, a realm, an application, a host, a group, a session, a connection, or a Destination-Host.

In some embodiments, the Diameter message in the method mentioned above may comprise a Diameter session establishment request message that originates from a Diameter client, a Diameter session establishment response message that originates from a Diameter server, a Diameter request message, a Diameter response message, or a Diameter answer message.

In some embodiments, detecting overload associated with the Diameter overload scope may include detecting overload associated with a second Diameter node, a realm, an application, a host, a group, a session, or a connection.

In some embodiments, the indication of the overload in the method mentioned above may identify an entity, such as a session, in an overload group corresponding to an overloaded Diameter node and the Diameter message. The receiver of the overload indicator may associate the identified entity to the overload group or groups to which that entity belongs and communicate that association to the sender of the overload indicator. The sender of the overload indicator may then use the overload group identifier(s) when communicating overload indications. Alternatively, or in addition, the sender may associate the identified entity to an overload group that is different from the overload group used by the receiver, and may use the different overload group when communicating overload conditions.

In some embodiments, a first Diameter node in the method mentioned above may assign Diameter messages or related sessions having a first characteristic to a first overload group, assign other Diameter messages or related sessions having a second characteristic to a second overload group, and, in response to detecting overload relating to the first characteristic, communicate an indication of overload to one or more originating nodes having communications assigned to the first overload group.

Figure 3:
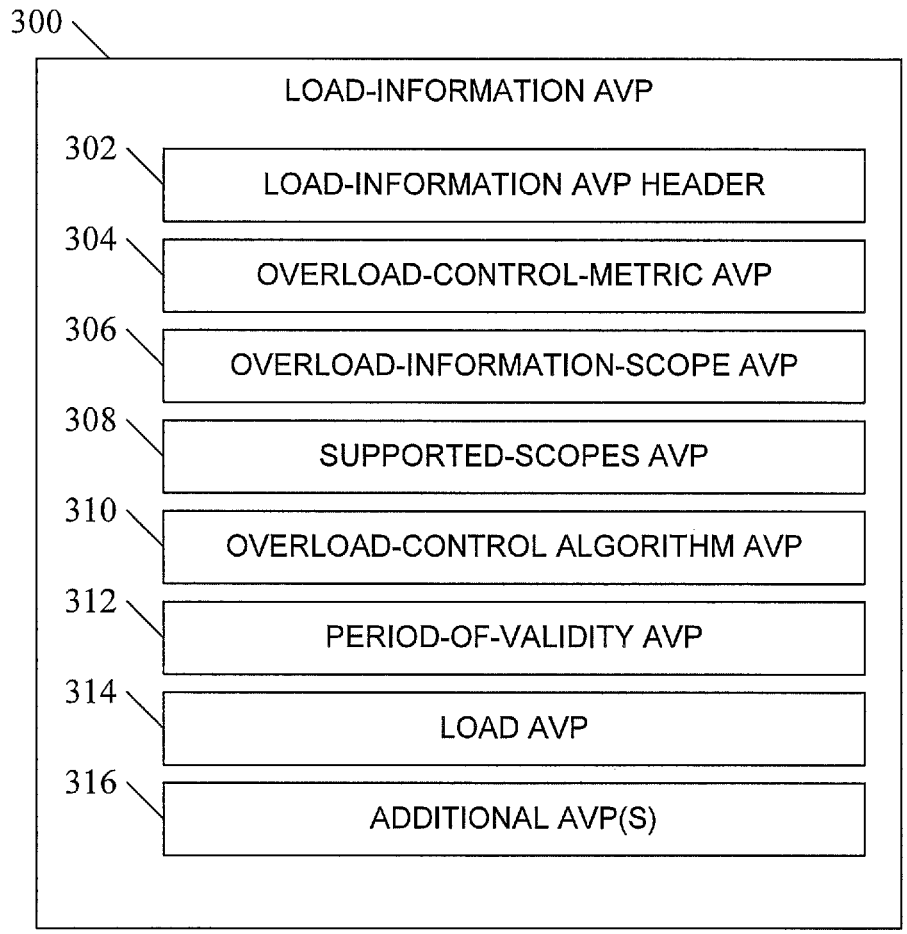
FIG. 3 is a diagram illustrating exemplary Diameter overload control information according to an embodiment of the subject matter described herein.

FIG. 3 is a diagram illustrating exemplary Diameter overload control information according to an embodiment of the subject matter described herein. Exemplary Diameter overload control information may be stored in a Diameter message and may be used in performing one or more aspects associated with Diameter overload control.

For example, Diameter overload control information may be stored in an attribute value pair, such as a Load-Information (Load-Info) AVP 300, and may be located in a data or payload portion of a Diameter message. In some embodiments, Load-Info AVP 300 may be a grouped or compound AVP and may contain one or more AVPs for storing overload control information or related information. In some embodiments, Diameter overload control information or Load-Info AVP 300 may be inserted into various Diameter messages. For example, Load-Info AVP 300 may be included in Diameter messages originating from a Diameter node that is overload-aware or that includes DOC 118.

Referring to the embodiment illustrated in FIG. 3, Load-Info AVP 300 may include a Load-Info Header AVP 302, an Overload-Control-Metric AVP 304, an Overload-Information-Scope AVP 306, a Supported-Scopes AVP 308, an Overload-Control-Algorithm AVP 310, a Period-Of-Validity AVP 312, a Load AVP 314, and/or additional AVP(s) 316.

Load-Info Header AVP 302 may contain any information for identifying Load-Info AVP 300 and/or related (e.g., contained) AVPs. For example, Load-Info Header AVP 302 may include a header identifier and/or other information, such as value indicating the length or size of Load-Info AVP 300 or a number of contained AVPs in Load-Info AVP 300.

Overload-Control-Metric AVP 304 may contain any information for determining overload and/or may include a load abatement procedure or other actions associated with overload control. The information provided in Overload-Control-Metric AVP 304 may differ depending on a current level of load and/or on the overload algorithm implemented. For example, Overload-Control-Metric AVP 304 may indicate a percentage of requests that should be dropped or not sent, when using a "message drop" algorithm. In another example, Overload-Control-Metric AVP 304 may indicate a maximum number of requests to send per second, when using a "rate control" algorithm. In some embodiments, information provided in Overload-Control-Metric AVP 304 may be valid for all or some requests in an indicated Diameter overload scope. In some embodiments, Overload-Control-Metric AVP 304 may utilize an Unsigned32 data type format. In some embodiments, Overload-Control-Metric AVP 304 may be the first (non-header) AVP in Load-Info AVP 300 and may appear exactly once per Load-Info AVP 300.

Overload-Information-Scope AVP 306 may contain any information (e.g., Diameter overload scope information) for determining a Diameter overload scope or context, e.g., usable for indicating to a sender which Diameter entity overload information is relevant. For example, Overload-Information-Scope AVP 306 may indicate a subset of requests to which overload information and/or overload control procedures should be applied. Overload-Information-Scope AVP 306 may include a scope type and details portions.

In embodiments of the subject matter described herein, Overload-Information-Scope AVP 306 may indicate "Destination-Host" as an overload scope, and may identify one or more aliases as Destination-Hosts to which overload control should be applied or to which the overload information is relevant. In some embodiments, Overload-Information-Scope AVP 306 may be the second (non-header) AVP in Load-Info AVP 300 and may appear exactly once per Load-Info AVP 300. Additional information associated with Overload-Information-Scope AVP 306 is discussed with regard to FIG. 4.

Supported-Scopes AVP 308 may contain any information for indicating Diameter overload scopes that can be supported, e.g., by a Diameter node. For example, Supported-Scopes AVP 308 may indicate a subset of Diameter overload scopes, such as a realm, an application, a host, a session group, a session, or a connection. In embodiments of the subject matter described herein, "Destination-Host" may be defined as a supported scope. In some embodiments, Supported-Scopes AVP 308 may be included in Capabilities-Exchange-Request (CER) messages or Capabilities-Exchange-Answer (CEA) messages. In some embodiments, Supported-Scopes AVP 308 may utilize an Unsigned64 data format. Supported-Scopes AVP 308 may contain a bitmap indicating the scopes supported by the client. For example, support for an initial six scopes (e.g., a realm, an application, a host, a session group, a session, or a connection) may be mandatory and may not be signaled (i.e., included in the bitmap). In this example, a least significant bit may indicate support for a seventh scope, with each subsequent bit representing another scope type. In embodiments using an Unsigned64 data format, Supported-Scopes AVP 308 may allow for up to 72 total scopes to be supported (including the initial six scopes). In some embodiments, new Diameter overload scopes may be defined via additional extensions. Supported-Scopes AVP 308 may be omitted (e.g., from Load-Info AVP 300) if no extension scopes are supported.

Overload-Control-Algorithm AVP 310 may contain any information for indicating an algorithm or procedure for reducing, shedding, or abating load. For example, Overload-Control-Algorithm AVP 310 may indicate a "message loss" algorithm, where when a node is overloaded, the node discards received messages. In another example, Overload-Control-Algorithm AVP 310 may indicate a "rate control" algorithm, where a transmission or reception rate is throttle if a rate value exceeds a threshold value or range. In yet another example, Overload-Control-Algorithm AVP 310 may indicate an algorithm that instructs a sender to stop sending communications or to send communications to another node for processing. In some embodiments, Overload-Control-Algorithm AVP 310 may be included in CER messages or CEA messages.

Period-Of-Validity AVP 312 may contain any information for indicating how long an overload-aware node should act on Diameter overload control information. For example, Period-Of-Validity AVP 312 may indicate a number of seconds in which one or more actions (e.g., an overload control metric or a load abatement procedure) should be enforced. In some embodiments, Period-Of-Validity AVP 312 may be optional or may be required if Overload-Control-Metric AVP 304 is non-zero.

Load AVP 314 may contain any information for specifying load information or load metrics. In some embodiments, various algorithms may be used to generate load metrics. Some algorithms may generate load metrics that reflect utilization of a most constrained resource and may be a linear representation of such utilization. For example, load metrics may indicate a percentage of resources utilized or available at a Diameter node. In some embodiments, Load AVP 314 may utilize an Unsigned32 data type format and may include a number between 0 and $2^{32}$-1 (4,294,967,295) for representing load, where 0 is "completely unloaded" 4,294,967,295 is "maximum capacity". In some embodiments, Load AVP 314 may be optional and/or may appear exactly once per Load-Info AVP 300. In some embodiments, if Load AVP 314 contains a value greater than zero, overload procedures may be in effect and a client may be instructed to take actions according to a negotiated overload control algorithm or procedure. In some embodiments, if Load AVP 314 is not included in Load-Info AVP 300, a previously established load value may be used. In some embodiments, Load AVP 314 may be used to avoid overload scenarios when possible (rather than to merely react to an ongoing overload situation). Information provided in Load AVP 314 may also be usable by peers to select among several otherwise equivalent servers. For example, information provided in Load AVP 314 may be applied as a weighting factor to a server selection algorithm used by DA 108. In another example, information provided in Load AVP 314 may be used by peers to independently implement back-off algorithms (e.g., queuing messages based on a certain ideal reception or transmission rate, pushback, or other techniques).

In some embodiments, load information in Load AVP 314 may be usable to distribute load between various nodes. For example, consider servers "A", "B", and "C" having communicated load information as shown in Table 1 to DA 108 or Diameter client 102. DA 108 or Diameter client 102 may apply loading information to domain name server (DNS) service record (SRV) weights as follows: Server "A": (100%-10%)×20=18, Server "B": (100%-60%)×20=12, Server "C": (100%-80%)×60=12. DA 108 or Diameter client 102 may then distribute load according to this 18/12/12 metric (e.g., 43% of traffic goes to server "A" and 28.5% goes to each of servers "B" and "C"). In other examples, load values may be applied to any capacity weighting information, e.g., information different from DNS SVR weights in Table 1.

TABLE 1

| Server | Load | SRV Weight |
|---|---|---|
| A | 10% | 20 |
| B | 40% | 20 |
| C | 80% | 60 |

Additional AVP(s) 316 may represent any other AVP for storing Diameter overload control related information. For example, a Load-Back-Up AVP may indicate a secondary node for processing Diameter request messages in case a current node becomes overloaded.

While FIG. 3 depicts exemplary Diameter overload control information, including Load-Info AVP 300 and various other AVPs, it will be appreciated that some Diameter overload control information may include fewer, additional, or different AVPs or information.

Figure 4:
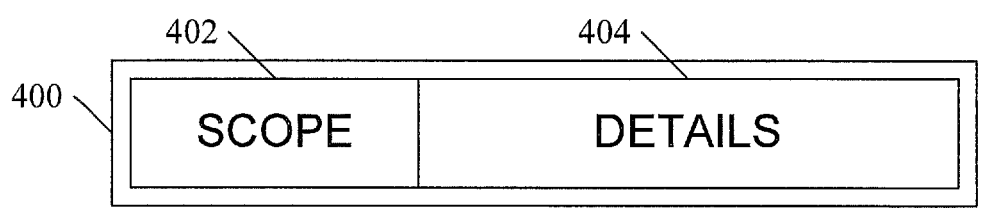
FIG. 4 is a diagram illustrating exemplary Diameter overload scope information according to an embodiment of the subject matter described herein.

FIG. 4 is a diagram illustrating exemplary Diameter overload scope information 400 according to an embodiment of the subject matter described herein. Diameter overload scope information 400 may be stored in a Diameter message and may be used in performing one or more aspects associated with Diameter overload control. For example, Diameter overload scope information 400 may be stored in an attribute value pair (AVP), such as Overload-Information-Scope AVP 306, and may be located in a data or payload portion of a Diameter message. In some embodiments, Diameter overload scope information 400 may be stored in a 32-bit OctetString data type AVP and may be nested in another AVP, such as Load-Info AVP 400.

Referring to the embodiment illustrated in FIG. 4, Diameter overload scope information 400 may include a scope portion 402 and a details portion 404. Scope portion 402 may include any information for indicating one or more Diameter overload scope types. For example, scope portion information may be values, bits, flags, or text. In embodiments of the subject matter described herein, scope portion 402 may identify Destination-Host as a scope. Other scope types may include a destination-realm, an application, a session-group, a connection, and a session.

Details portion 404 may include any information for defining or describing a Diameter overload scope. In some embodiments, details portion 404 may be included in an AVP and stored in various data formats, such as human-readable text like a UTF8String data format or an OctetString data format. Details portions 404 associated with a Destination-Host type may include a Destination-Host name and/or related AVP for identifying a particular Destination-Host. In embodiments of the subject matter described herein, details portion 404 may identify one or more particular aliases.

In some embodiments, Diameter overload scope information 400 may be inserted into various Diameter messages. For example, Load-Info AVP 400 may be included in any Diameter messages originating from a Diameter node that is overload-aware or that includes DOC 118.

One advantage that using Destination-Host as a mechanism for identifying an overload scope is that there is no need to inform the client that a particular session is attached to a particular overload group. There is no need to exchange any such information beforehand. The client already keeps track of which sessions talk to which destination host: such information is necessary just to route the session traffic to the proper destination host. When the client later gets an overload control instruction that should be applied to an identified destination host, the client applies the overload control to those sessions. Using Destination-Host as an overload scope does not impose any additional burden on the client more than what every client already must maintain just for routing.

In some embodiments (e.g., where multiple scopes are present or utilized), information associated with different overload scope types may be logically AND-ed (^) together. For example, if a Diameter session is associated with a Destination-Host scope and an application scope, Diameter overload control information (e.g., load abatement procedures) may be applied for Diameter messages that match both the Destination-Host and the application.

In some embodiments (e.g., where multiple scopes are present or utilized), information associated with similar overload scope types may be logically OR-ed (v) together. For example, if a Diameter session is associated with a Destination-Host scope and an application scope, Diameter overload control information (e.g., load abatement procedures) may be applied for Diameter messages that match either the Destination-Host or the application.

Figure 5A:
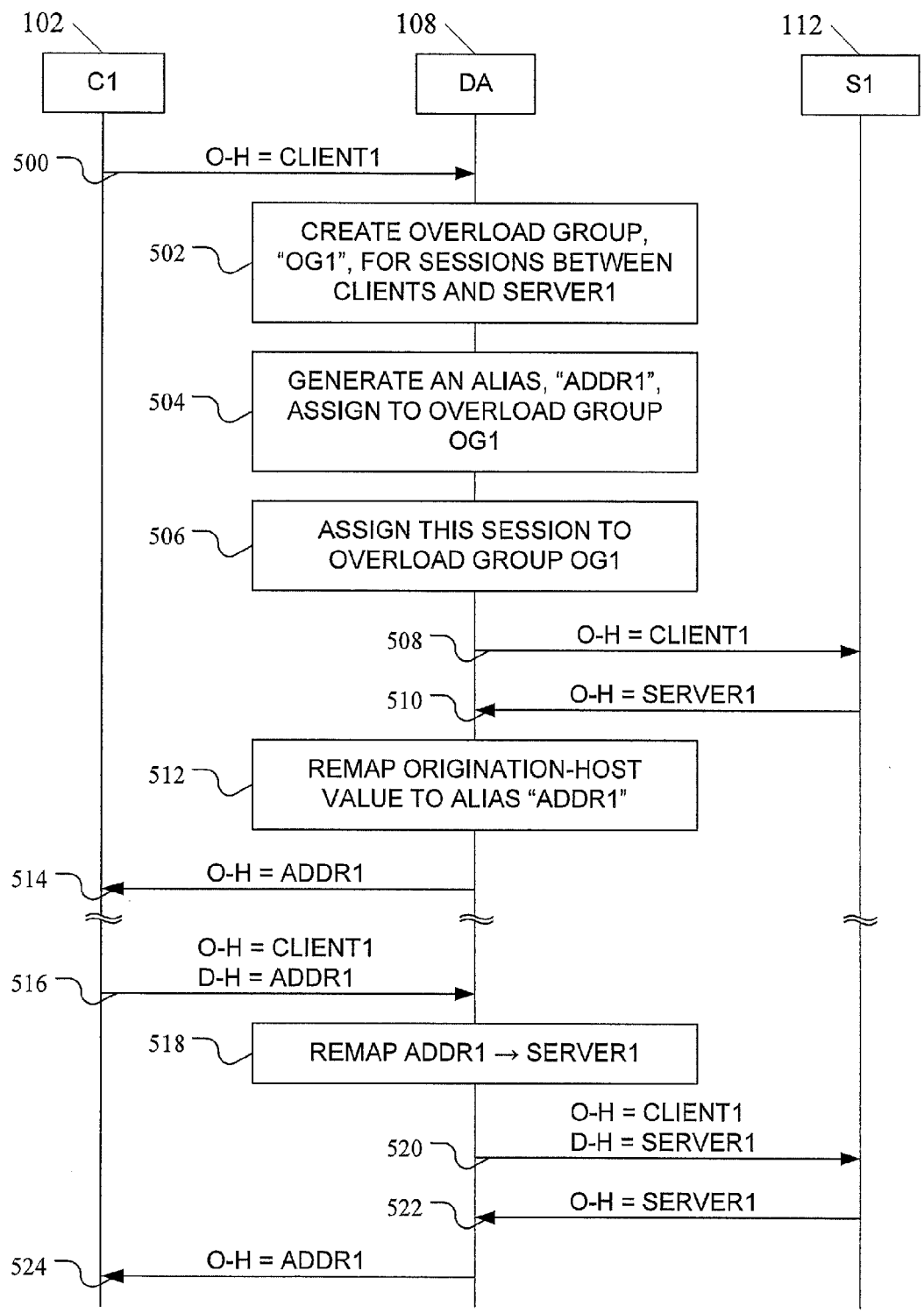
FIGS. 5A through 5C are diagrams illustrating exemplary messages associated with Destination-Host defined overload scope according to an embodiment of the subject matter described herein.
Figure 5B:
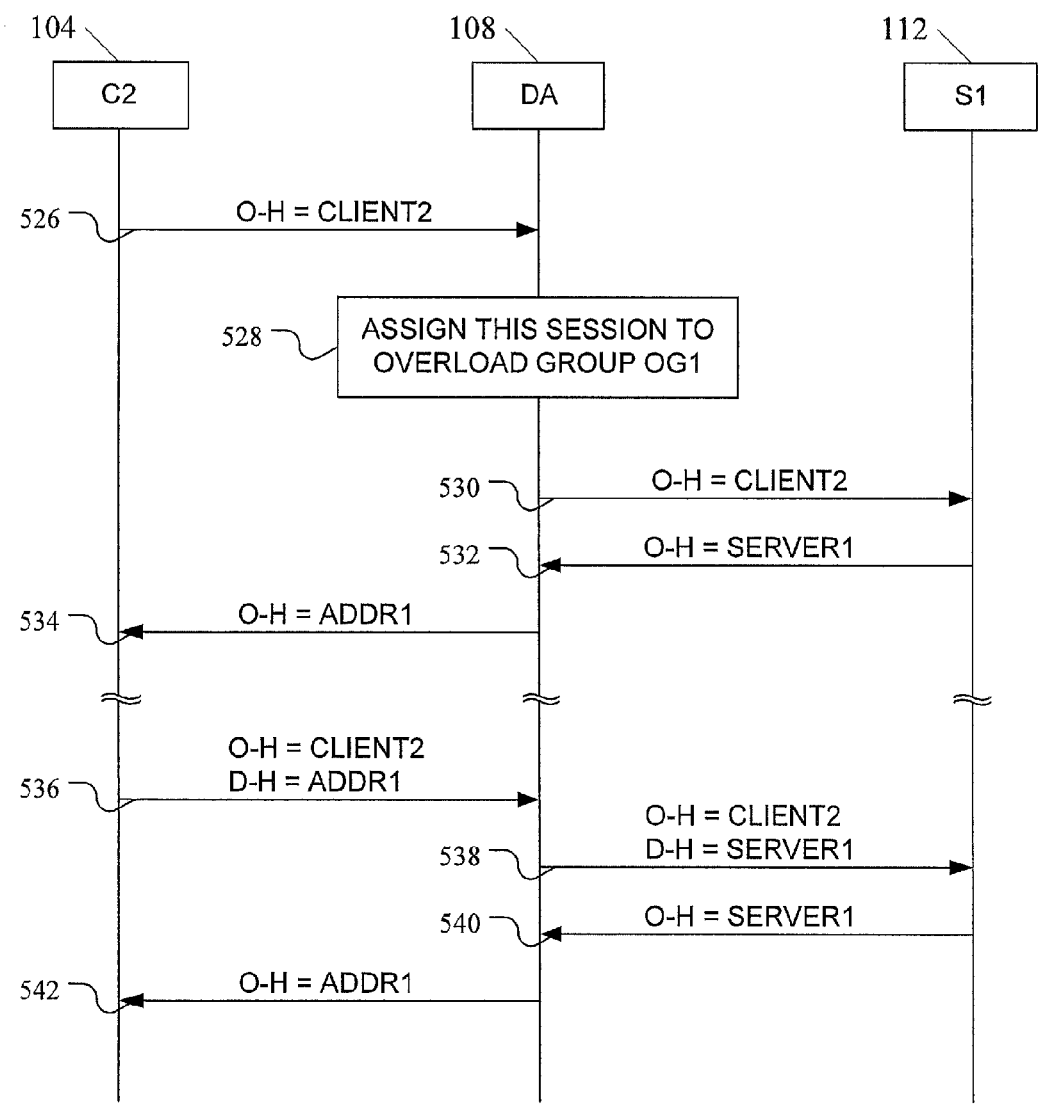
Figure 5C:
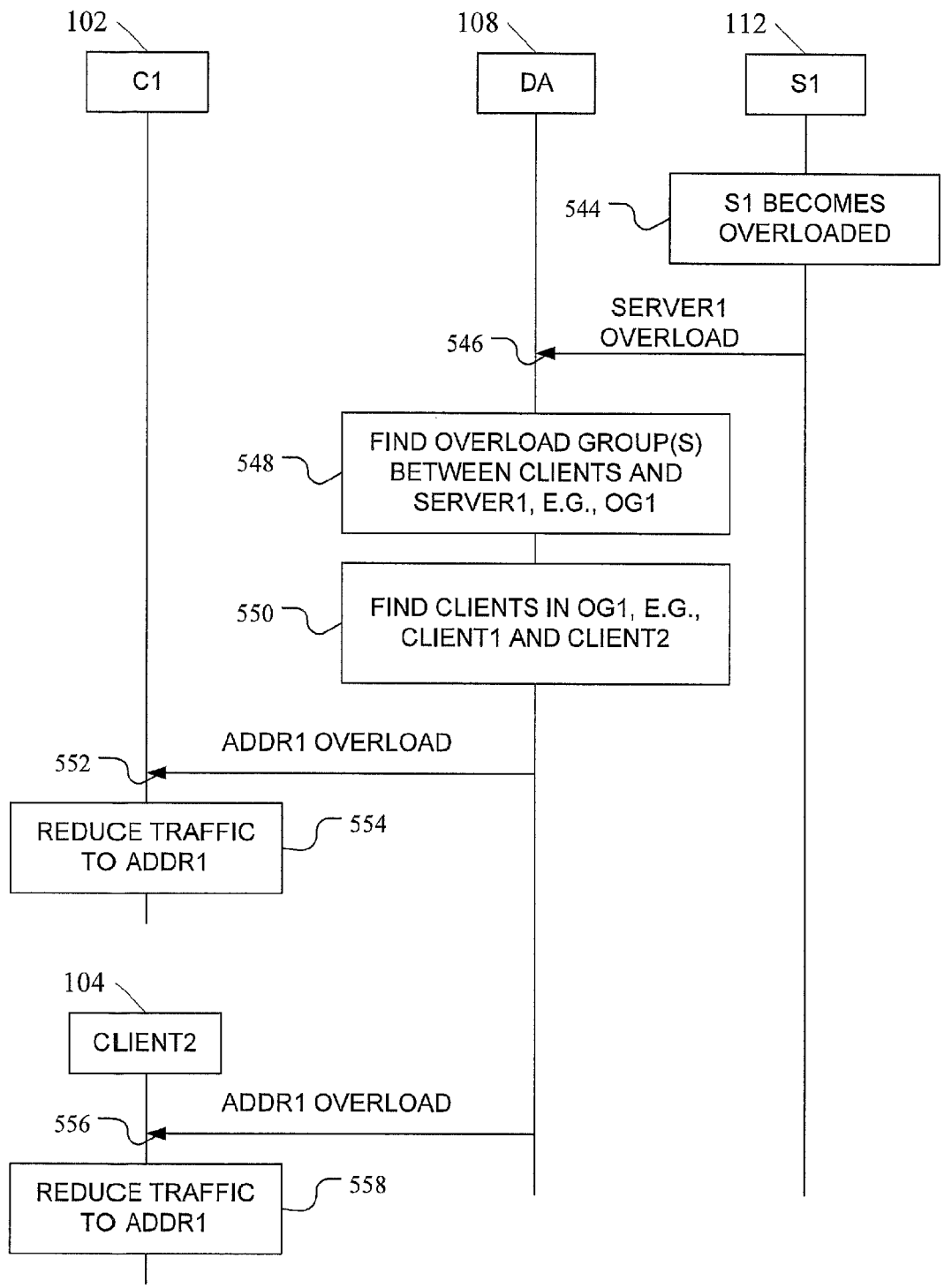

FIGS. 5A through 5C are diagrams illustrating exemplary messages associated with Destination-Host defined overload scope according to an embodiment of the subject matter described herein.

In the embodiment illustrated in FIG. 5A, Diameter client C1 102 and Diameter servers 112-116 may communicate using DA 108. In some embodiments, C1 102 and Diameter servers 112-116 may be overload-aware (e.g., may include DOC 118 and/or related functionality). For example, C1 102 or Diameter servers 112-116 may determine or be aware of overload scopes for various messages or sessions, may perform load abatement procedures or other actions in response to indications of overload, and/or may generally be capable of using, reading, and/or providing Diameter overload control information.

C1 102 may send a Diameter request message 500, which may be directed to or intercepted by DA 108. For example, DA 108 may receive a session establishment request from C1 102 that require services from one of a plurality of Diameter servers 112-116. In this example, C1 102 may have no visibility of Diameter servers 112-116.

In response to receiving Diameter request message 500, at block 502, DA 108 may create an overload group, which in this example is named "OG1", for sessions between all clients and S1 112. At block 504, DA 108 generates an alias, which in this example is "ADDR1", and assigns that alias to overload group OG1. At block 506, DA 108 assigns the session being requested by C1 102 to overload group OG1.

DA 108 may then route, relay, forward, or otherwise provide the message (message 508) to S1 112. Message 508 includes an Origin-Host field that lists C1 102 as the sender of the message. In some embodiments, the Diameter request message may be modified to include Diameter overload control information, such as an overload scope associated with the message and a load metric associated with DA 108. S1 112 may receive Diameter request message 508 and perform various services associated with processing the Diameter request message. After processing the Diameter request message, S1 112 may send a response message 510 back to C1 102. Message 510 lists S1 112 as the Origin-Host and may include various overload control information. Message 510 may include Diameter overload control information, such as a load metric indicating that 99% of resources at S1 112 are being utilized.

DA 108 receives the response message 510 and, at block 512, remaps the Origin-Host value by replacing the address of S1 112 with the alias for overload group OG1, i.e., "ADDR1". DA 108 may route, relay, or otherwise provide the Diameter response message (message 514) to C1 102. In some embodiments, message 514 may be modified to include Diameter overload control information, such as an overload scope associated with the message and a load metric associated with DA 108.

From this point on, whenever C1 102 sends a message that is part of the established session between C1 102 and S1 112, the message will list "ADDR1" as the alias. For example, C1 102 sends message 516, which lists C1 as the origination host and "ADDR1" as the destination host. Since ADDR1 is an address associated with DA 108, the message will be correctly routed to DA 108, which will forward the message to its intended destination, S1 112, by remapping the alias from "ADDR1" to the address of S1 112 (block 518.)

S1 112 receives the modified message 520 and processes the message. S1 112 may send a response message 522, which DA 108 receives. DA 108 modifies the message (not shown) and forwards the modified message 524 to C1 102. The modified message 524 again lists "ADDR1" as the Origin-Host. The example process continues in FIG. 5B.

In FIG. 5B, another client, this time Diameter client C2 104, also requests a session with S1 112. DA 108 receives a request message 526, and, at block 528, decides to assign this session also to overload group OG1. DA 108 then forwards the message to S1 112 (message 530.) S1 112 receives and processes request message 530 and sends a response message 532, which is intercepted by DA 108. DA 108 modifies this message by changing the Origin-Host value to the Destination-Host address that has been associated with overload group OG1, i.e., "ADDR1", and sends the modified message 534 to C2 104.

Once the session has been established, C2 104 will set the alias for all messages related to that session to "ADDR1". In the embodiment illustrated in FIG. 5B, for example, C2 104 sends message 536, which lists "ADDR1" as the alias. DA 108 modifies this message (not shown) and forwards the modified message 538 to S1 112. S1 112 sends a reply message 540, which DA 108 intercepts. DA 108 modifies the message to include the specified alias for overload group OG1 as the Origin-Host value and sends the modified message 542 to C2 104.

In FIG. 5C, at step 544, Diameter server S1 112 becomes overloaded. For example, S1 112 may determine that 100% of its resources are being utilized or that no additional messages can be handled.

DA 108 then detects or is notified of the overload condition affecting S1 112. In the embodiment illustrated in FIG. 5C, for example, S1 112 notifies DA 108 of the overload condition via a Diameter Load-Information AVP message 546. The Diameter overload control information may include various types of overload related information, such as indication of overload, a session group (the same as or different from a session group determined by DA 108), a period of validity, and any other relevant information. In one embodiment, a Diameter message (e.g., a Device-Watchdog-Request (DWR) or Device-Watchdog-Answer (DWA) message) may be sent to one or more nodes, such as DA 108 or Diameter clients 102-106. In some embodiments, DWR messages and DWA messages may be used to allow exchange of load information during otherwise quiescent connections. Alternatively, overload associated with the Diameter overload scope may be detected by DA 108 directly. For example, DA 108 or DOC 118 may be configured to monitor one or more nodes, realms, applications, sessions, or other overload entities. Various monitoring techniques may be used in identifying or detecting overload, e.g., by polling, by subscribing to monitored nodes, or by receiving indications of overload from one or more monitored nodes.

In response to this notification, DA 108 may determine which sessions or session groups are likely to be affected by the overload condition (block 546.) In one embodiment, DA 108 may query database 110 and determine that overload group OG1 includes sessions with S1 112. At block 548, DA 108 may then determine which clients have sessions that are members of overload group OG1. In this example, DA 108 may determine that C1 102 and C2 104 have sessions that are part of overload group OG1, but client3 106 does not. Thus, DA 108 may send an overload message 550 to C1 102, to notify C1 102 that an overload condition exists for all sessions that connect to Destination-Host "ADDR1". Alternatively, Diameter overload control information may "piggyback" or be inserted in existing Diameter messages traversing DA 108, such as a Diameter response message from S1 112. The overload control information may include information such as an overload scope associated with the message and an overload control algorithm for shedding or abating load at S1 112. In the embodiment illustrated in FIG. 5C, the overload control information may indicate an overload scope of Destination-Host and may include the alias "ADDR1".

In response, C1 102 may then take steps to reduce traffic associated with the overload scope, which in this example means reducing traffic to sessions that have ADDR1 as a Destination-Host (block 552.) For example, C1 102 may stop communicating with S1 112 for a period of time (e.g., based on an associated period of validity associated with the Diameter overload control information) or another action that abates load at S1 112. Meanwhile, C1 102 may continue to send traffic to other destination hosts.

DA 108 may also send a similar overload message 554 to C2 104. In response, client 2 104 may also takes steps to reduce traffic to ADDR1 (block 556.)

In this manner, DA 108 may apply overload control to traffic that is directed to S1 112 by using the alias "ADDR1" for sessions between clients and S1 112. This technique is particularly valuable in situations where a network operator desires to perform "topology hiding", i.e., when the network operator wants to hide from the client the existence and/or exact number of servers that are present within the network. The use of an alias allows the creation of overload groups in a manner that does not reveal information from which the topology of the network may be gleaned or inferred. This technique is also valuable where a network operator uses virtual or virtualized networks, e.g., when the exact number of servers available may fluctuate according to demand and/or when the network topology may be dynamic or otherwise fluid according to particular needs.

Figure 6:
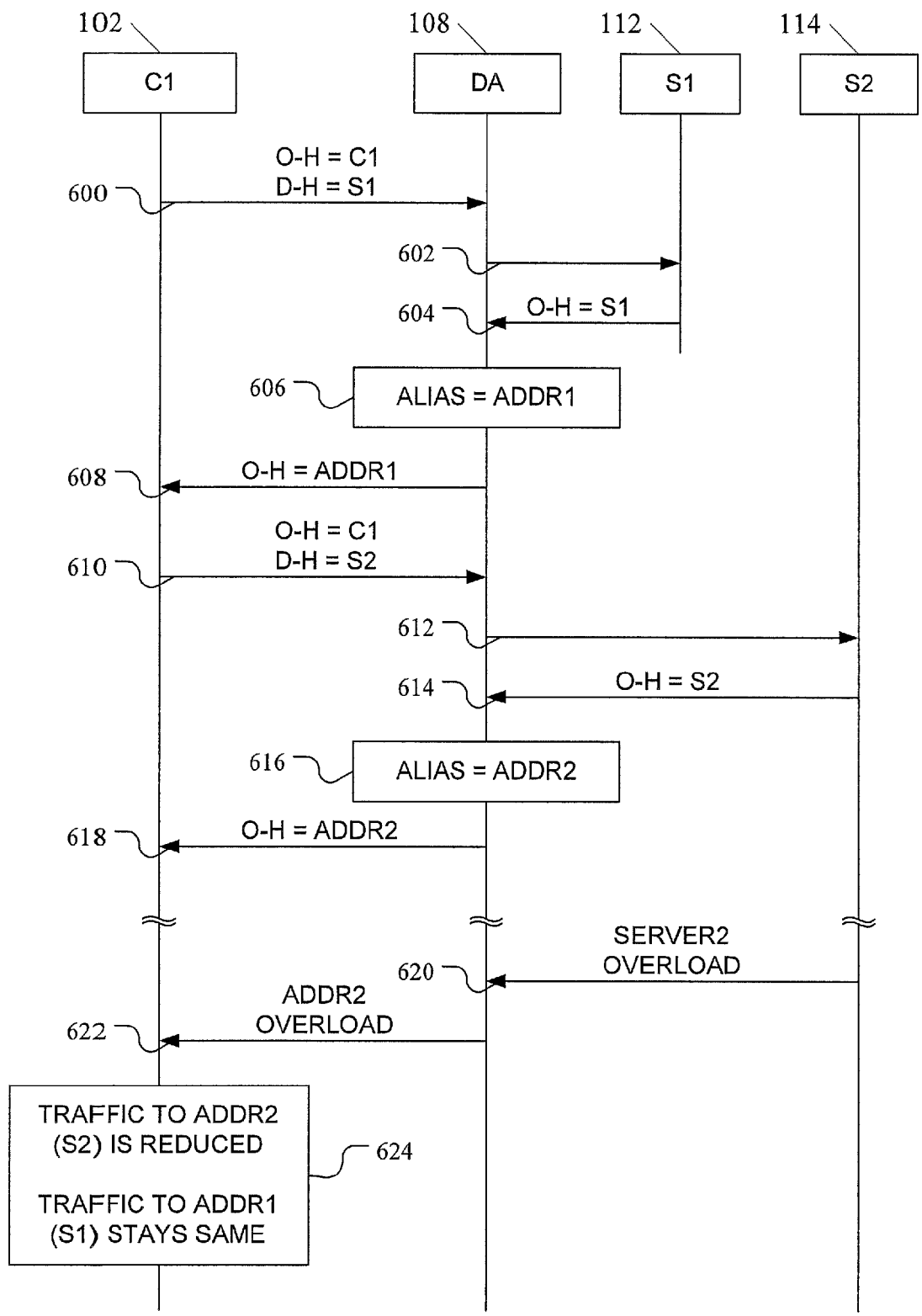
FIG. 6 is a diagram illustrating exemplary messages associated with Destination-Host defined overload scope according to yet another embodiment of the subject matter described herein.

FIG. 6 is a diagram illustrating exemplary messages associated with Destination-Host defined overload scope according to yet another embodiment of the subject matter described herein. In the embodiment illustrated in FIG. 6, C1 102 establishes sessions with each of two different servers, S1 112 and S2 114. DA 108 receives a first message 600 with an Origin-Host value of "C1", the address of C1 102, and a alias of "S1", the address of S1 112. In this embodiment, DA 108 forwards the message to S1 112 (message 602.) S1 112 receives and processes the message, and sends a reply message 604 back to DA 108. FIG. 6 illustrates the point that DA 108 may wait until the target of the request returns a favorable response before DA 108 goes through the steps of assigning an alias to the session. In FIG. 6, for example, at block 606, DA 108 assigns an alias of "ADDR1" to the session being created, and modifies received message 604 by replacing the original Origin-Host value "S1" with the alias "ADDR1" before sending the modified message 608 to C1 102. Going forward, all messages for that session sent by C1 102 will have an alias of ADDR1.

In the embodiment illustrated in FIG. 6, C1 102 sends another session request message 610, which DA 108 routes to S2 114 (message 612.) S2 114 sends a response message 614, which DA 108 receives. At block 616, DA 108 associates another alias, this time "ADDR2", to the session. DA 108 modifies the received message 614 to create modified message 618 that has an Origin-Host value of "ADDR2" instead of the original Origin-Host value of "S2". From this point on, all messages for that session sent by C1 102 will have a alias of ADDR2.

It should be noted that DA 108 may specify a unique alias for any type of overload group, and that overload groups may represent any set of resources. For example, Diameter server S1 112 may support several applications or functions, named F1, F2, and F3. DA 108 may specify three separate aliases, one for each function. Thus, sessions that are established with F1 are given one alias, sessions that established with F2 are given another alias, and sessions that are established with F3 are given a third alias. In this manner, if function F2 is overloaded but the other functions on S1 112 are not overloaded, DA 108 (or S1 112) may impose overload control on a function-by-function basis by sending overload information that specifies Destination-Host as the overload scope and identifying the alias that is associated with the particular function that is overloaded.

Some time later, S2 114 suffers an overload condition. In the embodiment illustrated in FIG. 6, S2 114 sends an overload notification message 620 to DA 108. Message 620 may be a Load-Information AVP 300, or it may be an existing Diameter message, e.g., a DWA message, a DWR message, a CER message, a CEA message, or any Diameter message defined for a purpose other than overload control. DA may then go through its list of Destination-Host proxy addresses to see which ones are associated with S2 114. In the example described above, Destination-Host address ADDR2 is associated with S2 114 but Destination-Host address ADDR1 is not.

DA 108 may then send an overload notification message 622 to clients that send traffic to this Destination-Host address, which in this example includes C1 102. In response to receiving the overload notification message 622, C1 102 reduces traffic that is being sent to ADDR2 but does not impose any restrictions on traffic that is being sent to ADDR1. (Block 624.)

Although the example illustrated in FIG. 6 pertains to sessions with two different servers, the same principle may be applied to sessions with two different services on the same server. In this scenario, DA 108 may assign a different aliases to a session based on the combination of server and service, server and application, and so on. In some embodiments, a single node may act both as a client and a server. In these and other scenarios, the same principle may be extended to operate at multiple levels within a network hierarchy or at multiple points along a multi-stage communications path. Referring to the system illustrated in FIG. 1, for example, S1 112 may receive requests from multiple DAs, not just from DA 108. In this scenario, S1 112 may advertise its address as being one value to DA 108 but another value to a different DA not shown in FIG. 1. Likewise, S1 112 might rely on upstream nodes, such as database nodes, gateways, application functions, and the like, in which case S1 112 may use the same technique of providing multiple aliases for DA 108 to use, depending on what resources are required by the incoming session requests. Similarly, clients may use the same technique of presenting multiple aliases to downstream nodes.

Although the examples presented herein involve sessions and the use of Diameter messages in particular, the subject matter described herein is not so limited. The principles described herein may be implemented using other protocols that have fields that are the same as or similar in function to the Destination-Host field in Diameter messages. The creation of a logical entity called an overload group is for semantic convenience and is not a required feature of every implementation of the subject matter described herein. For example, sessions may be mapped directly to aliases without going through the abstraction of an overload group.

Figure 7:
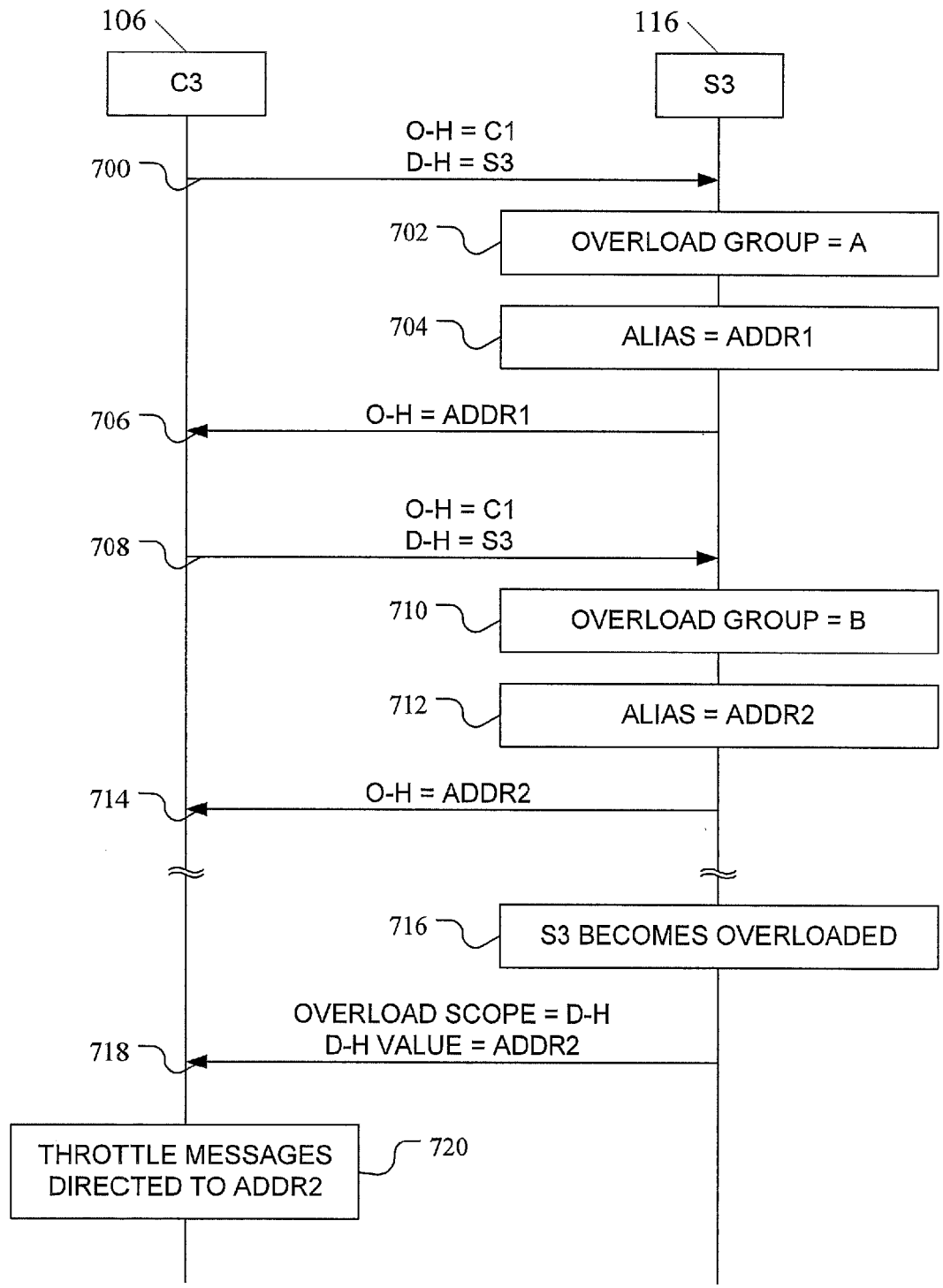
FIG. 7 is a diagram illustrating exemplary messages associated with Destination-Host defined overload scope according to yet another embodiment of the subject matter described herein.

FIG. 7 is a diagram illustrating exemplary messages associated with Destination-Host defined overload scope according to yet another embodiment of the subject matter described herein. In the embodiment illustrated in FIG. 7, Diameter client C3 106 and Diameter server S3 116 communicate without using an intermediary node, such as DA 108. In some embodiments, C3 106 and S3 116 may be overload-aware (e.g., may include DOC 118 and/or related functionality). For example, C3 106 or S3 116 may determine or be aware of overload scopes for various messages or sessions, may perform load abatement procedures or other actions in response to an indication of overload, and/or may generally be capable of using, reading, or providing Diameter overload control information.

In the embodiment illustrated in FIG. 7, C3 106 sends a Diameter request message 700 to S3 116. For example, C3

106 may request subscriber information from a subscriber profile registry (SPR) at S3 116.

S3 116 may receive message 700 and determine an overload group associated with message 700 and/or a related Diameter session. In some embodiments, overload groups can be applied or assigned based on available information. For example, S3 116 may assign messages and/or related sessions based on whether S3 116 can handle requests using random access memory (RAM) resources or requests need an on-disk local database consultation. In this example, requests that can be handled using RAM resources without the need to consult an on-disk local database may be assigned to an overload group "A" and requests that can be handled but need access to the on-disk local database may be assigned to an overload group "B". In the embodiment illustrated in FIG. 7, at block 702, S3 116 determines that message 700 contains a request that can be handled using RAM resources and should therefore be associated with overload group "A". At block 704, S3 116 creates or looks up a destination host value that is assigned to overload group "A", e.g., "ADDR1".

S3 116 then sends a response message 706 to C3 106. Message 706 includes the value ADDR1 as the Origin-Host address, which C3 106 records and uses for the Destination-Host address for subsequent messages related to that session. Message 706 may also include Diameter overload control information, such as an overload scope of "Destination-Host" and a load metric indicating that 99% of resources at S3 116 are being utilized. Thus, in one scenario, Diameter client C3 106 may attempt to find another, less overloaded Diameter server in response to learning Diameter S3 116 is almost completely overloaded.

In the embodiment illustrated in FIG. 7, Diameter client C3 106 attempts to establish another session with Diameter server S3 116 and thus sends another Diameter request message 708 to Diameter server S3 116. For example, message 708 may be a request for extensive subscriber information from the SPR at S3 116. At block 710, S3 116 determines that this request requires disk access and should therefore be associated with overload group "B". At block 712, S3 116 creates or looks up a destination host value that is assigned to overload group "B", e.g., "ADDR2".

S3 116 then sends a response message 714 to C3 106. Message 714 includes the value ADDR2 as the Origin-Host address, which C3 106 records and uses for the Destination-Host address for subsequent messages related to that session.

At block 716, S3 116 becomes overloaded. For example, S3 116 may determine that 100% of its resources are being utilized or that no additional messages can be handled. In an example where sessions are assigned session groups "A" and "B" based on whether requests require a local database or whether requests require only RAM resources, when S3 116 experiences overload due to I/O bottlenecks associated with the local database, but can service requests for sessions only require RAM resources, S3 116 may send an overload notification message for group B and not group A. For example, a Diameter message (e.g., Device-Watchdog-Request message) may be sent.

Thus, S3 116 sends a Diameter request message 718 containing Diameter overload control information (e.g., Load-Info AVP 200) may be sent from S3 116 to C3 106. The Diameter overload control information may include various types of overload related information, such as indication of overload, a session group (e.g., session group "B"), a period of validity, and any other relevant information. In the embodiment illustrated in FIG. 7, message 718 indicates an overload scope of Destination-Host ("D-H"), and identifies the alias as "ADDR2".

Diameter client C3 116 may receive message 718 containing the Diameter overload control information. At block 720, in response to receiving the Diameter overload control information, C3 116 may throttle messages for sessions having a alias of ADDR2 while not throttling messages for sessions having a alias of ADDR1.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for Destination-Host defined overload scope, the method comprising:
at a Diameter agent for routing Diameter signaling messages within a telecommunications network:
receiving, by the Diameter agent and from a Diameter client, a Diameter session establishment request message for establishing a Diameter session with a Diameter server;
in response to receiving the Diameter session establishment request message, creating an overload group;
generating, by the Diameter agent, an alias;
assigning, by the Diameter agent, the alias to the overload group;
routing, by the Diameter agent, the Diameter session establishment request message to the Diameter server;
receiving, by the Diameter agent and from the Diameter server, a Diameter response message to the Diameter session establishment request message; and
remapping an origin host parameter value in the Diameter response message by replacing, in the Diameter response message, an address of the Diameter server with the alias for the overload group; and
routing, by the Diameter agent and to the Diameter client, the Diameter response message with the origin host parameter value set to the alias for the overload group, thereby causing the Diameter client to address subsequent messages associated with the session to the alias.

2. The method of claim 1 wherein the Diameter client includes the alias in Destination-Host attribute value pairs (AVPs) in the subsequent messages.

3. The method of claim 1 comprising:
determining, by the Diameter agent, an overload condition affecting members of the overload group; and
in response to determining the overload condition, sending an indication of the overload condition to the Diameter client, wherein the indication specifies an overload scope of destination-host and identifies the destination host using the alias.

4. The method of claim 3 wherein determining an overload condition comprises detecting the overload condition or receiving notification of the overload condition.

5. The method of claim 3 wherein the Diameter client receives the indication, and in response to receiving the indication, applies overload control to sessions with the identified destination host.

6. The method of claim 1 wherein the overload group includes at least one of:
sessions having the same client;
sessions having the same category of client;
sessions having the same priority;
sessions having the same quality of service level;
sessions having the same server;
sessions using the same service;
sessions using the same application;
sessions using the same communications link;

sessions using the same ingress or egress port; and
sessions entering or exiting a network via the same network node.

7. The method of claim 1 wherein the Diameter agent uses the alias to hide details about the topology of the telecommunications network from at least one Diameter entity that participates in a session in the overload group.

8. A system for Destination-Host defined overload scope, the system comprising:

a Diameter agent for operating within a telecommunications network, the agent including:
  at least one network interface for receiving, from a Diameter client, a Diameter session establishment request message for establishing a Diameter session with a Diameter server, routing the Diameter session establishment request message to the Diameter server, and receiving a Diameter response message from the Diameter server in response to the Diameter session establishment request message; and
  a Diameter overload control unit for, in response to the receiving of the Diameter session establishment request message, creating an overload group, generating an alias, and assigning the alias to the overload group, wherein the Diameter overload control unit remaps an origin host parameter value in the Diameter response message by replacing, in the Diameter response message, an address of the Diameter server with the alias for the overload group and wherein the at least one interface routes, to the Diameter client, the Diameter response message with the origin host parameter value set to the alias for the overload group, thereby causing the Diameter client to address subsequent messages associated with the session to the alias.

9. The system of claim 8 wherein the Diameter client includes the alias in Destination-Host attribute value pairs (AVPs) in the subsequent messages.

10. The system of claim 8 wherein the Diameter overload control unit determines an overload condition affecting the members of the overload group, and, in response to determining the overload condition, sends an indication of the overload condition to the Diameter client, wherein the indication specifies an overload scope of destination-host and identifies the destination host using the alias.

11. The system of claim 10 wherein determining an overload condition comprises detecting the overload condition or receiving notification of the overload condition.

12. The system of claim 8 wherein the Diameter client receives the indication, and in response to receiving the indication, applies overload control to sessions with the identified destination host.

13. The system of claim 8 wherein the overload group includes at least one of:
  sessions having the same client;
  sessions having the same category of client;
  sessions having the same priority;
  sessions having the same quality of service level;
  sessions having the same server;
  sessions using the same service;
  sessions using the same application;
  sessions using the same communications link;
  sessions using the same ingress or egress port; and
  sessions entering or exiting a network via the same network node.

14. The system of claim 8 wherein the Diameter agent uses the alias to hide details about the topology of the telecommunications network from at least one Diameter entity that participates in a session in the overload group.

15. A non-transitory computer readable medium having stored thereon executable instructions that when executed by the processor of a computer control the computer to perform steps comprising:
  at a Diameter agent for routing Diameter signaling messages within a telecommunications network:
  receiving, by the Diameter agent and from a Diameter client, a Diameter session establishment request message for establishing a Diameter session with a Diameter server;
  in response to receiving the Diameter session establishment request message, creating an overload group;
  generating, by the Diameter agent, an alias;
  assigning, by the Diameter agent, the alias to the overload group;
  routing, by the Diameter agent, the Diameter session establishment request message to the Diameter server;
  receiving, by the Diameter agent and from the Diameter server, a Diameter response message to the Diameter session establishment request message; and
  remapping an origin host parameter value in the Diameter response message by replacing, in the Diameter response message, an address of the Diameter server with the alias for the overload group; and
  routing, by the Diameter agent and to the Diameter client, the Diameter response message with the origin host parameter value set to the alias for the overload group, thereby causing the Diameter client to address subsequent messages associated with the session to the alias.

* * * * *